Nov. 16, 1965  M. W. MARTIN, JR  3,217,357
APPARATUS FOR BLOW MOLDING PLASTIC ARTICLES
Filed Nov. 8, 1962  8 Sheets-Sheet 2

INVENTOR.
MERRITT W. MARTIN, JR.
BY OLSEN AND STEPHENSON

Nov. 16, 1965 M. W. MARTIN, JR 3,217,357
APPARATUS FOR BLOW MOLDING PLASTIC ARTICLES
Filed Nov. 8, 1962 8 Sheets-Sheet 4

INVENTOR.
MERRITT W. MARTIN, JR.
BY OLSEN AND STEPHENSON

FIG. 7

INVENTOR.
MERRITT W. MARTIN, JR.
BY OLSEN AND STEPHENSON

INVENTOR.
MERRITT W. MARTIN, JR
BY
OLSEN AND STEPHENSON

United States Patent Office 3,217,357
Patented Nov. 16, 1965

3,217,357
APPARATUS FOR BLOW MOLDING PLASTIC ARTICLES
Merritt W. Martin, Jr., Saline, Mich., assignor to Hoover Ball and Bearing Company, Saline, Mich., a corporation of Michigan
Filed Nov. 8, 1962, Ser. No. 236,382
4 Claims. (Cl. 18—5)

This invention relates generally to the blow molding of plastic articles and more particularly to an improved blow molding apparatus which is particularly adapted to automatic operation.

In the blow molding of plastic articles, a blow molding machine is repeatedly cycled through the following steps:

(a) The parison is formed,
(b) A mold is closed about the parison,
(c) The parison is blow into conformity with the mold,
(d) The mold is opened, and
(e) The blown article is removed from the machine.

The blown plastic article is necessarily encumbered with excess plastic material, normally referred to as "flash" which must be subsequently removed, and appears to have "seams" which are formed at the engaging faces of the mold sections. It is desirable in such a machine, for efficiency purposes, to reduce the cycle time as much as possible, to interrupt the cycle process as quickly as possible in the event of a malfunction in the process, and to close the molds as tightly as possible to facilitate flash removal and reduce the size of the seams. It is an object of this invention, therefore, to provide versatile apparatus for blow molding plastic articles in which a low cycle time is provided; the apparatus is automatically recycled so that a minimum of manual attention is required; the cycle is automatically interrupted and the machine shut off in the event of a malfunction in the cycle; the mold sections when in closed positions are locked tight under high pressure; and the mold sections are initially separated at low speed to minimize the danger of a blown article adhering to a mold section.

A further object of this invention is to provide a blow molding machine with a toggle-type mechanism for opening and closing the molds to thereby obtain a slow opening of the molds and a tight closing of the molds.

Another object of this invention is to provide an improved apparatus for moving the mold sections in a blow molding machine whereby the mold sections are initially moved toward closed positions at a low pressure which is insufficient to overcome the resistance offered by plastic material which, because of a malfunction, is improperly disposed between the mold sections and is therefore engaged by the mold sections during closing movement, to provide for a final movement of the mold sections into closed positions at a high pressure once the mold sections have moved to predetermined closely spaced or just touching positions, and to provide for interruption of the cycle process in the event more than a preset time period elapses between the start of the cycle and movement of the mold sections to their predetermined positions.

Further objects, features and advantages of this invention will become apparent from a consideration of the following description, the appended claims, and the accompanying drawings in which:

Figure 1:
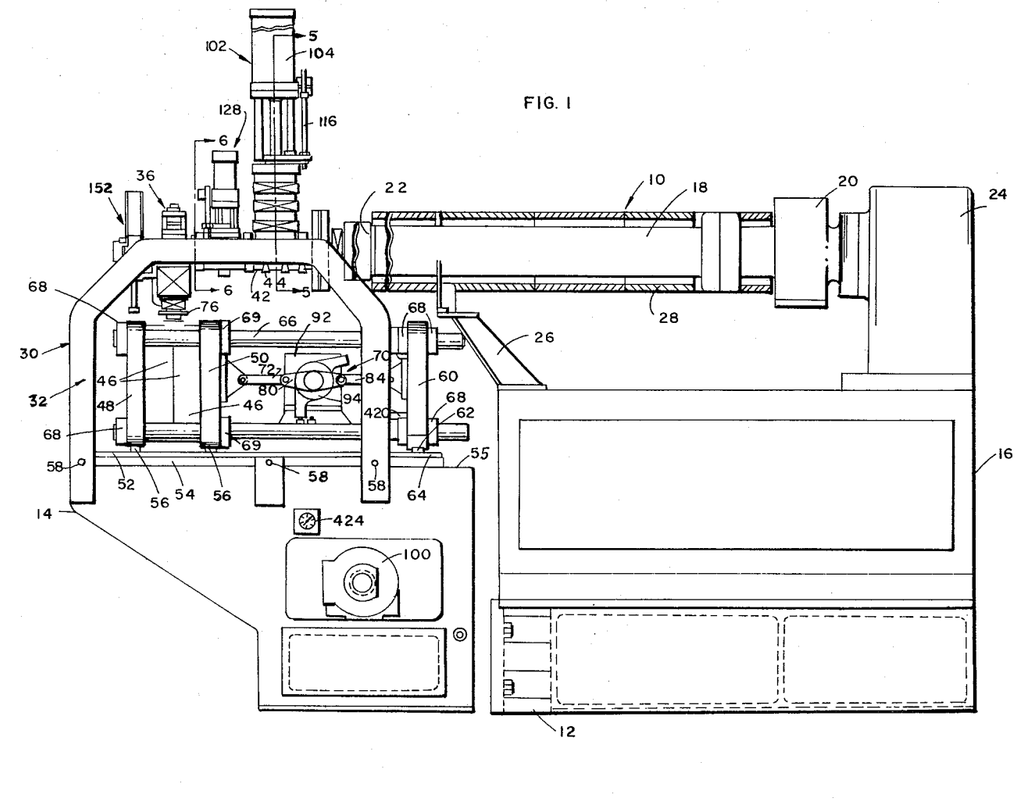
FIGURE 1 is a side elevational view of the blow molding machine of this invention, with the insulating sleeve for the extruder in the machine broken away and shown in section for the purpose of clarity.

With reference to the drawing, the blow molding apparatus of this invention, indicated generally at 10 in FIG. 1, consists of a main frame 12, having a front end 14 and a rear end 16, on which a conventional plasticizer or extruder 18 is mounted. Plastic, in a granular form, is fed to the rear end of the extruder 18 through an inlet box 20 and is discharged from the forward end 22 of the extruder 18 in a heated semi-fluid condition. The extruder 18 is connected to and driven by a motor 24 which is mounted on the main frame 12 and is supported adjacent its front end on a support bracket 26 secured to the main frame 12. An insulating sleeve 28 surrounds the extruder 18.

Figure 2:
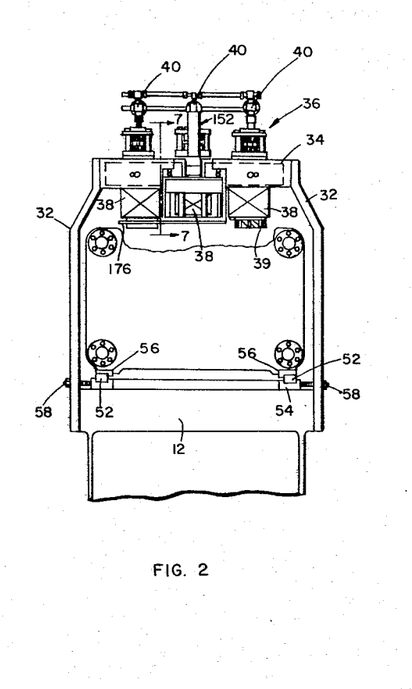
FIGURE 2 is a foreshortened elevational view of one end of the machine shown in FIG. 1.

A bridge assembly 30 is mounted on the main frame 12, adjacent the front end 14 thereof, and includes a pair of transversely spaced upright bridge members 32 (FIGS. 1 and 2) which are connected at their lower ends to the main frame 12. A plurality of connecting cross frame members 34, only one of which is shown, are connected to and extend between the upper ends of the bridge members 32.

A die head assembly, indicated generally at 36, is mounted on the bridge assembly 30 and includes a plurality of die heads 38, shown as being three in number in the illustrated embodiment of the invention, it being understood that the number of die heads used depends on the number of plastic articles to be formed in each cycle of the machine 10. The detail construction of a die head 38, which forms no part of the present invention, is illustrated in copending application Serial No. 110,501, filed May 16, 1961, now Patent No. 3,102,679 and assigned to the assignee of this application. Each die head 38 includes an annular passage for heated plastic in a semi-fluid condition and each passage has a lower open discharge end 39 through which the plastic is forced to form a plurality of side-by-side downwardly extending tubular parisons having open lower ends. Each die head 38 also includes an air passage (not shown) for injecting air under pressure into the parison formed on the die head, and a three-way valve 40 which communicates with the passage.

Figure 2A:
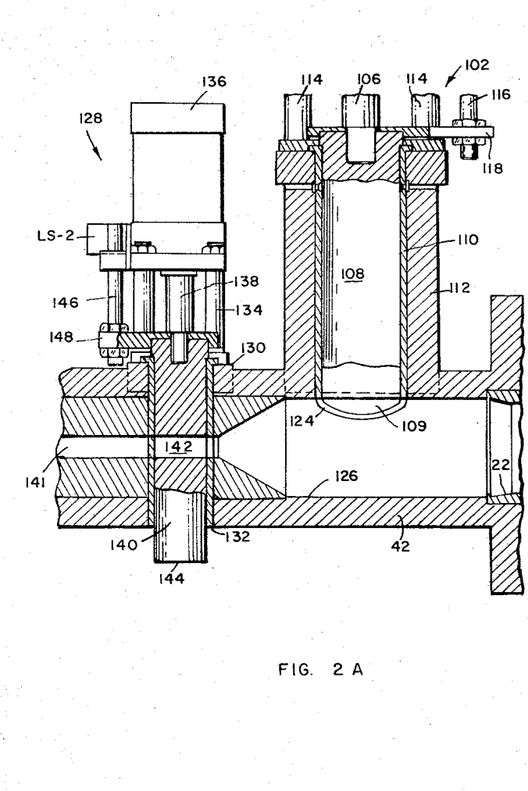
FIGURE 2A is a fragmentary longitudinal sectional view of a portion of the machine of this invention.

A tubular member 42 (FIGS. 1 and 2A) connects the die head assembly 36 to the front end 22 of the extruder 18 for delivering heated plastic in a semi-fluid condition from the extruder 18 to the die head assembly 36 for downward travel therethrough to form three downwardly extending parisons at the die head openings 39. Band heater elements 44 are provided on the tubular member 42 to maintain the plastic in a heated semi-fluid condition during travel therethrough.

When the parisons are extruded from the die heads 38 so that they extend downwardly and are suspended therefrom, they are positioned between a pair of horizontally spaced mold sections 46 which, when they are moved toward each other into engagement as shown in FIG. 1, have mold cavities (not shown) formed therein corresponding in number to the number of parisons suspended from the die head assembly 36. The mold sections 46 are removably mounted on a pair of platens 48 and 50 which are slidably mounted on a pair of transversely spaced horizontally extending rails 52 which are mounted on a rail mounting plate 54 supported on a horizontal portion 55 of the main frame 12 adjacent the front end 14 thereof. Each of the platens 48 and 50 carries a pair of horizontally spaced shoes 56 which slidably support the platens 48 and 50 on the rails 52. A plurality of adjusting bolts 58 are mounted on the bridge assembly 30 and the main frame 12 so that they engage opposite sides of the rail mounting plate 54. On adjustment of the bolts 58, the mounting plate 54 is adjustable transversely of the main frame 12 to align the mold cavities in the mold sections 46 with the plastic discharge openings 39 in the die head assembly 36.

A third platen 60 likewise carries shoes 62 which are slidably mounted on rails 64 which constitute horizontal extensions of the rails 52 and are similarly mounted on the rail mounting plate 54. The platens 48 and 60, which are hereinafter referred to as the "end platens" are rigidly connected by four tie bars 66 which extend through the platens 48 and 60 adjacent the four corners thereof, and adjustable nuts 68 are mounted on the tie bars 66 adjacent the platens 48 and 60 for maintaining the platens 48 and 60 in a desired adjusted horizontally spaced relation. The tie bars 66 extend through the platen 50, which is hereinafter referred to as the "center platen," adjacent the corners thereof, and the center platen 50 carries bushings 69 through which the tie bars 66 extend, to insure a free sliding movement of the tie bars 66 through the center platen 50.

A mold actuating mechanism, indicated generally at 70, is provided for opening and closing the mold formed by the sections 46. The mechanism 70 includes a link 72 pivotally connected at one end, by a pin 74, to a bracket 76 which is secured to the center platen 50. The opposite end of the link 72 is pivotally connected, by a pin 78, to one end of an arm 80, the opposite end of which is pivotally connected, by a pin 82, to one end of a second link 84. The opposite end of the link 84 is pivotally connected by a pin 86, to a bracket 88 mounted on the end platen 60. Intermediate its ends, and substantially midway between the pins 78 and 82, the arm 80 is secured to a shaft 90 which is driven by and mounted on a hydraulic motor unit 92. The unit 92 is reversible and is therefore operable to rotate the shaft 90 in both clockwise and counterclockwise directions. A switch actuating member 94, which is formed with a pair of radially outwardly extending legs 96 and 98 is likewise secured to the shaft 90 for a purpose to appear presently. The hydraulic motor unit 92 is connected to a hydraulic pump unit 100 which is mounted on the main frame 12 for supplying fluid under pressure to the unit 92. It can thus be seen that the links 72 and 84, which are of substantially equal effective lengths and are connected at 78 and 82 to points on the arm 80 equally spaced from the axis of shaft 90 so that they are at all times parallel, and the arm 80 constitute a toggle mechanism, which when straightened, as shown in FIG. 1, moves the platens 50 and 60 the maximum distance apart, to close the mold, and when folded, as shown in solid lines in FIG. 3, moves the platens 50 and 60 toward each other to open the mold.

Figure 3:
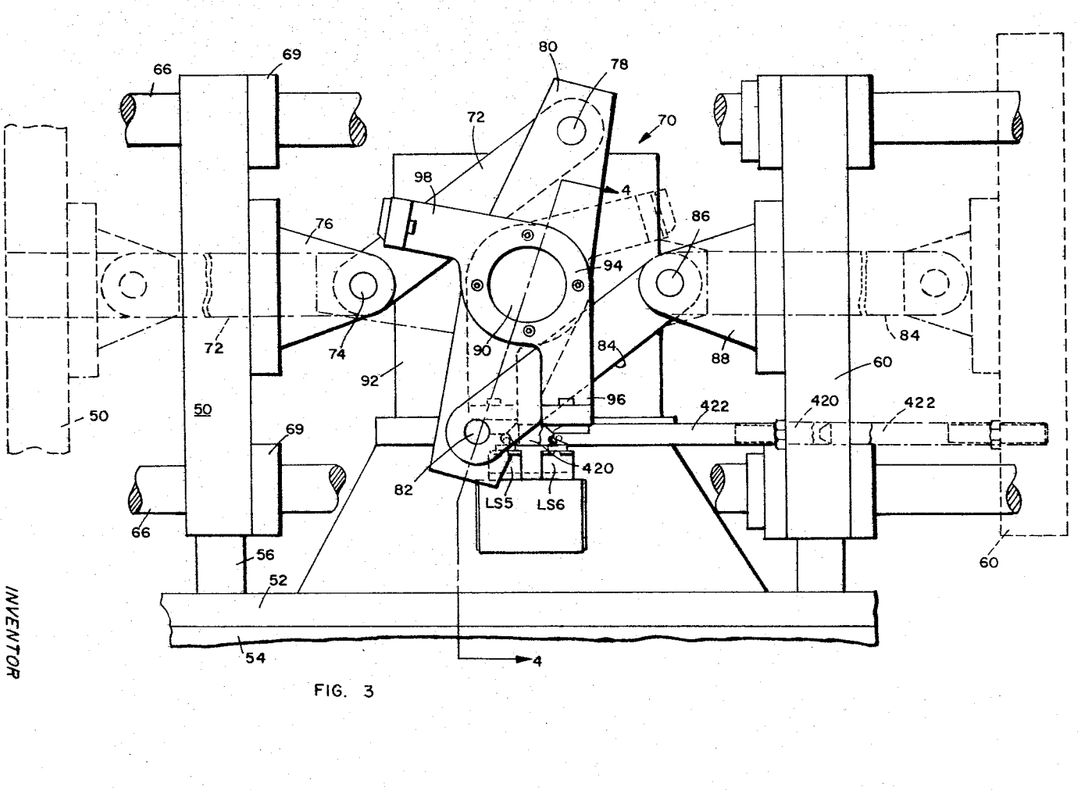
FIGURE 3 is a fragmentary elevational view of the mold actuating assembly in the machine of this invention, showing the assembly in substantially a "mold open" position in solid lines and in a "mold locked" position in broken lines.
Figure 4:
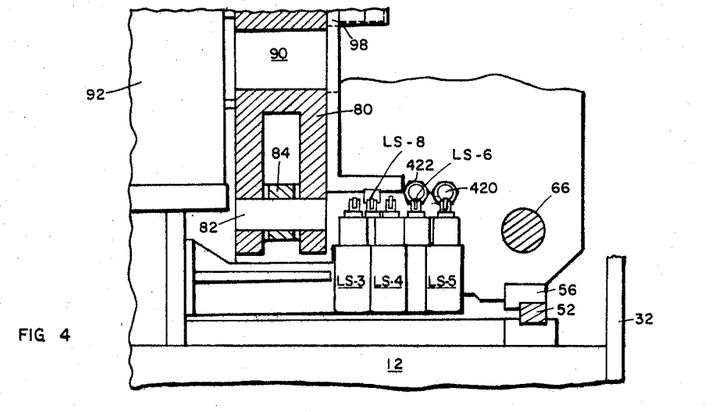
FIGURE 4 is a fragmentary sectional view of the mold actuating assembly and the limit switches associated therewith, looking substantially along the line 4—4 in FIG. 3.

On rotation of the shaft 90 in one direction, namely counterclockwise, as viewed in FIG. 3, from a position in which the arm 80 is at an angle to the horizontal, the arm 80 moves the links 72 and 84 toward positions in which they are in substantial horizontal alignment, as shown in broken lines. During such movement, the center platen 50 and the end platen 60 are moved horizontally on the rails 52 and 64 in directions away from each other. Since the end platen 48 is connected to the end platen 60, during movement of the platen 60 away from the center platen 50 the platen 48 is moved toward the platen 50. When the links 72 and 84 have been moved into nearly horizontal alignment, in which the pins 74, 78, 82 and 86 are likewise in nearly horizontal alignment, the mold sections 46 have been moved into positions in which they are touching or nearly touching so that they close the lower ends of parisons suspended from the die heads 38. The mold sections 46 are at this time in "mold closed" positions. On further rotation of the shaft 90 in a counterclockwise direction, the links 72 and 84 are moved into alignment so that the mold sections 46 are tightly engaged and are in what is referred to as "mold locked" positions maintained by the toggle mechanism. As hereinafter explained, the toggle mechanism moves the platens into this latter position with such force that the tie bars 66 are stretched slightly.

When the shaft 90 is rotated in an opposite direction, namely clockwise, from the position illustrated in FIG. 1, the arms 72 and 84 are moved out of their substantially aligned positions toward the folded angular parallel positions illustrated in FIG. 3. During such movement, the platens 50 and 60 are moved toward each other, to thus move the platens 48 and 50 which carry the mold sections 46 away from each other to thereby open the mold. When the platens 50 and 60 have been moved to their solid line positions illustrated in FIG. 3, the mold sections 46 are horizontally spaced a distance sufficient to permit plastic articles formed in the mold to be moved downwardly between the mold sections.

An accumulator assembly 102 is mounted on the bridge assembly 30 at a position between the front end 22 of the extruder 18 and the die head assembly 36. The accumulator assembly 102 includes a hydraulic piston and cylinder assembly 104 having a piston rod 106 which is connected at its lower terminal end to a plunger 108 mounted for reciprocal up and down movement within a sleeve 110. A frame member 112 supports the sleeve 110 and also supports a plurality of upwardly extending rods 114 on which the cylinder assembly 104 is mounted. Also supported on the rods 114, for a purpose to appear presently, are a pair of limit switches LS–1 and LS–9. A switch actuating rod 116, connected to the piston rod 106 by a bracket 118 so that it moves up and down with the piston rod 106 is formed with a pair of vertically spaced shoulders 120 and 122. In the lower position of the plunger 108, illustrated in FIG. 5, the shoulder 120 engages the switch LS–1 so as to actuate the switch, and in an upper position of the plunger 108, the shoulder 122 actuates the switch LS–9.

Figure 5:
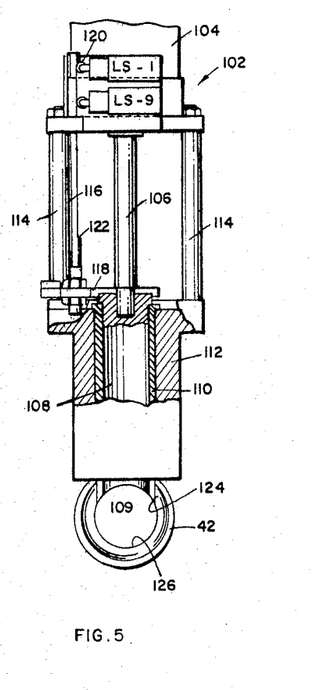
FIGURE 5 is an enlarged fragmentary sectional view of the accumulator assembly in the machine of this invention, looking substantially along the line 5—5 in FIG. 1.

As shown in FIG. 5, the lower open end 124 of the sleeve 110 communicates with an interior passage 126 in the tubular member 42 which conveys plastic from the extruder 18 to the die head assembly 36. When the plunger 108 is free to move upwardly in the sleeve 110, heated plastic from the extruder 18 travels into the passage 126 and upwardly into the sleeve 110. When the cylinder assembly 104 is actuated to move the piston rod 106 downwardly, plastic in the sleeve 110 is forced downwardly by the plunger 108 so as to force the plastic into the passage 126. As a result, since during operation of the machine 10 the extruder 18 operates continuously, the parisons are formed much more rapidly, by virtue of the inclusion of the accumulator assembly 102 in the machine 10 than they would be formed if only the extruder 18 was feeding plastic to the parisons during their formation.

A plastic shutoff valve, hereinafter referred to as the "parison valve assembly" 128 (FIGS. 1 and 6) is mounted on the bridge assembly 30 at a position between the die head assembly 36 and the accumulator assembly 102. The parison valve assembly 128 includes a frame member 130 which supports a downwardly extending sleeve 132 that extends through the tubular member 42. A plurality of upwardly extending rods 134 are also supported on the frame member 130 and they support a hydraulic cylinder assembly 136 which includes a downwardly extending piston rod 138 secured at its lower end to a plunger 140 mounted for reciprocal movement within the sleeve 132. The plunger 140 is formed with a through hole 142 which, in the downwardly moved illustrated position of the plunger 140, is axially aligned with a reduced diameter passage 141 in the tubular member 42 which communicates with the passage 126 and the die head assembly 36. The passage 141 is of a diameter corresponding to the diameter of the opening 142. In an upwardly moved position of the plunger 140 in which the lower end 144 of the plunger 140 is in the position indicated in dotted lines (FIG. 6), the plunger 140 is raised so as to move the hole 142 out of alignment with the passage 141 so as to close the passage 141 at the plunger 140.

Figure 6:
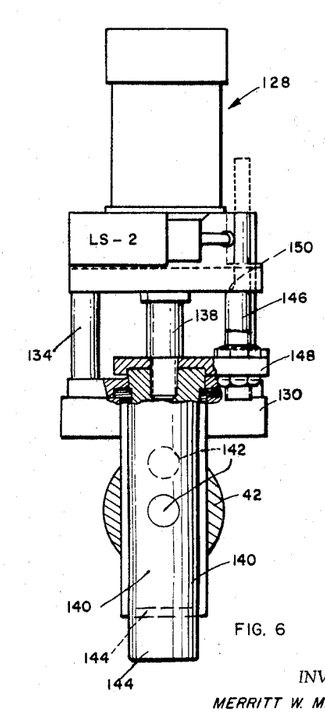
FIGURE 6 is an enlarged fragmentary sectional view of the parison valve in the machine of this invention, looking substantially along the line 6—6 in FIG. 1.

A switch actuating rod 146 is rigidly attached to the piston rod 138 by a bracket 148 and is formed with a shoulder 150 positioned so that it will actuate a switch LS-2 when the plunger 140 is moved upwardly to move the hole 142 out of alignment with the axial passage 141 in the tubular member 42. Thus, when the plunger 140 is in its upper position, the valve assembly 128 is closed so as to shut off the supply of plastic to the die head assembly 36, and when the plunger 140 is in its lower position, the valve assembly is open so that plastic can flow to the die head assembly.

Figure 7:
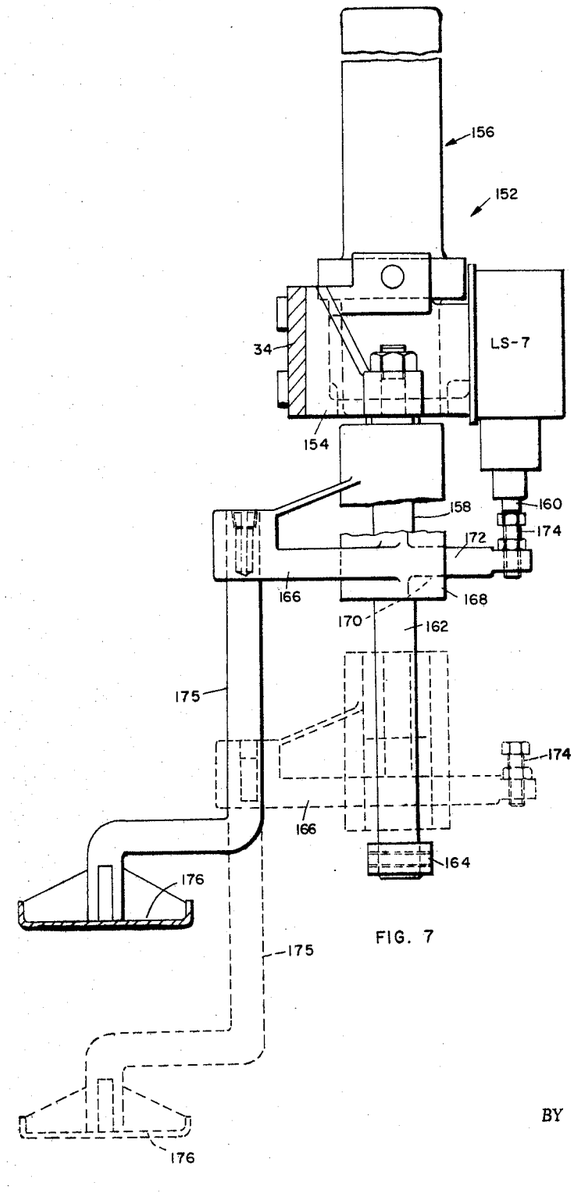
FIGURE 7 is an enlarged sectional view of the stripper assembly in the machine of this invention looking substantially along the line 7—7 in FIG. 2, with some parts of the assembly broken away and other parts shown in section for the purpose of clarity, and showing a downwardly extended position of the stripper plate in broken lines.

A stripper assembly 152 for the machine 10 is mounted on the bridge assembly 30 at a position adjacent the die head assembly 36. The stripper assembly 152 functions to remove the blown plastic articles from the die heads 38. In other words, after the articles have been formed, they are suspended from the lower ends of the die heads 38, and the stripper assembly 152 operates to strip the articles from the die heads 38 so that they fall downwardly onto a suitable conveyor. As shown in FIG. 7, the stripper assembly 152 includes a frame member 154 which is mounted on one of the cross frame members 34 in the bridge assembly 30. An air operated cylinder assembly 156, which includes a downwardly extending piston rod 158 is mounted on the frame 154 alongside a limit switch LS-7 which has a downwardly extending actuating pin 160. Suspended from the frame 154 are a pair of downwardly extending guide rods 162 which are connected at their lower ends by a brace 164. A carrier frame 166 includes a pair of upright sleeves 168 which are slidably mounted on the guide rods 162, and a cross frame member 170 which is connected to the lower end of the piston rod 158. A projection 172 on the cross frame member 170 carries an adjustable actuator 174 which is engageable with the switch pin 160 when the carrier 166 is in its upper position illustrated in FIG. 7. On operation of the cylinder assembly 156 to move the piston rod 158 downwardly, the carrier 166 is moved downwardly to the broken line position shown in FIG. 7, and the switch pin 160 is released. During such downward movement of the carrier 166, a stripper plate or bracket 176 which is secured by irregularly shaped arms 175 to the carrier 166 is also moved downwardly. The bracket 176 is shaped so that portions thereof substantially surround the annular plastic discharge openings 39 in the die heads 38, as illustrated in copending application Serial No. 110,501. As a result, when the stripper bracket 176 is moved downwardly from its solid line position shown in FIG. 7 toward its dotted line position, the bracket 176 engages the blown plastic articles suspended from the die heads 38 so as to separate the articles from the die heads so that they are free to fall downwardly onto a suitable conveyor (not shown).

To facilitate a later description of the operation of the machine 10, the hydraulic circuit, indicated generally at 180 in FIG. 8 will first be described. In the circuit 180, the hydraulic pump unit 100, which includes a pair of pumps 182 and 184 driven by a common motor 186, is supplied with hydraulic fluid through an inlet line 188 disposed in a reservoir 190. The pump 182, which is of low volume high pressure type, is connected through a conduit 192 to a conduit 194 in which a filter 196 is positioned. The pump 184, which is of high volume low pressure type, is likewise connected through a conduit 198 to the conduit 194 and a check valve 200 is interposed in the conduit 194 between its connections to the conduits 192 and 198. The conduit 194 is connected at one end to a pressure regulating valve 204 which is connected by a conduit 202 to a conduit 203 which empties into tank 190. A pressure regulating valve 208 is also connected to the conduit 202 and to a conduit 206 which connects to conduit 194. A pilot line 210 which is connected to a two-position valve body 212 that is actuated by a solenoid designated solenoid #3 is also connected to valve 208. When solenoid #3 is deenergized, it is in the position shown in FIG. 8 in which a passage 214 therein communicates with a pressure regulating valve 216 that is connected by a conduit 218 to the reservoir 190. In the energized position of the valve 212, a passage 220 therein is connected to the conduit 210 and is blocked. A pilot line 201, connected to line 194 between check valve 200 and conduit 206, is connected to valve 204. In a preferred embodiment of the invention, the valve 216 is adjusted to open at a selected pressure between 50 and 200 p.s.i., the valve 204 opens at about 300 p.s.i. and the valve 208 opens at about 1000 p.s.i.

When the pressure in line 194 exceeds 300 p.s.i., the pressure setting for valve 204, the fluid in pilot line 201 opens valve 204, check valve 200 is closed, and pump 184 pumps through line 203 to tank. When valve body 212 is in the position shown, the pressure in valve 208 is equalized at the pressure setting for valve 216, e.g. 50–200 p.s.i., so that the pressure in conduit 194 cannot exceed this pressure. In this condition of valve 208 some fluid flows into conduit 202 to tank. When valve 212 is shifted to block pilot line 210, valve 208 will not direct fluid to line 202 until the pressure in conduit 194 exceeds the pressure setting of valve 208, namely, 1000 p.s.i. in the preferred embodiment. It can thus be seen that solenoid #3 functions to determine the pressure in conduit 194 and the volume of fluid supplied to conduit 194. When solenoid #3 is de-energized, a large volume of fluid is available to be supplied to line 194, but the pressure of this fluid is relatively low; and when solenoid #3 is energized the volume of fluid which is available to be supplied to conduit 194 is reduced and the pressure of this fluid can be increased to a higher pressure.

The conduit 194 is connected to a conduit 222 which communicates through a pilot passage 224 with a valve body 226 which is actuated by two solenoids designated solenoid #2 and solenoid #4. The conduit 222 also communicates through a conduit 228 with a hydraulically actuated valve body 230 which communicates through conduits 232 and 234 with the reversible hydraulic motor unit 92. When solenoid #4 is energized, valve body 226, which is shown in a neutral position in which conduit 224 is blocked, is moved to the left as shown in FIG. 8 so that fluid from the conduit 224 flows through a pilot passage 236 to the left side of the valve body 230 so as to move it to the right from its illustrated neutral position. In this moved position of the valve 230, fluid from the conduit 228 flows through the valve body 230 to the conduit 232 so as to rotate the shaft 90 for the hydraulic motor unit 92 in a clockwise direction as viewed in FIGS. 3 and 8. When solenoid #2 is energized, the valve body 226 is moved to the right so that actuating fluid is supplied to valve body 230 through pilot passage 238. Valve body 230 is then moved to a position to direct fluid to motor unit 92 so that the shaft 90 is rotated in an opposite direction. A tank conduit 240 communicates with the valve body 226 and a tank conduit 242 communicates with the valve body 230.

The conduit 222 is connected to a conduit 246 which is connected to a pressure relief valve 248 that is connected through a line 250 to the tank 190. The relief valve 248 controls the fluid pressure in the line 246 and is set to open at a pressure between 500 and 900 p.s.i. A one-way check valve 252 in the conduit 222 prevents flow of fluid from left to right in the line 222 as viewed in FIG. 8. The conduit 246 is also connected to a hydraulic-pneumatic accumulator 254, an upper end portion 256 of which is filled with a gas such as nitrogen. The purpose of the accumulator 254, the gas pressure of which is controlled by the valve 248, is to provide for a storage of a volume of hydraulic fluid under pressure which can be discharged quickly to the cylinder assembly 104 so as to provide for a rapid downward movement of the piston rod 106.

The conduit 246, adjacent the accumulator 254, is connected to a conduit 258 which is connected to a two-position valve body 260 controlled by a solenoid, indicated as solenoid #1. The conduit 258 is also connected, through a conduit 261, to a valve body 262 in a hydraulically actuated two-position valve.

The solenoid valve body 260 is connected to the hydraulic actuators at opposite ends of the valve body 262 by pilot lines 264 and 266 and to the hydraulic cylinder assembly 136 for the parison valve assembly 128 through conduits 268 and 270.

Figure 8:
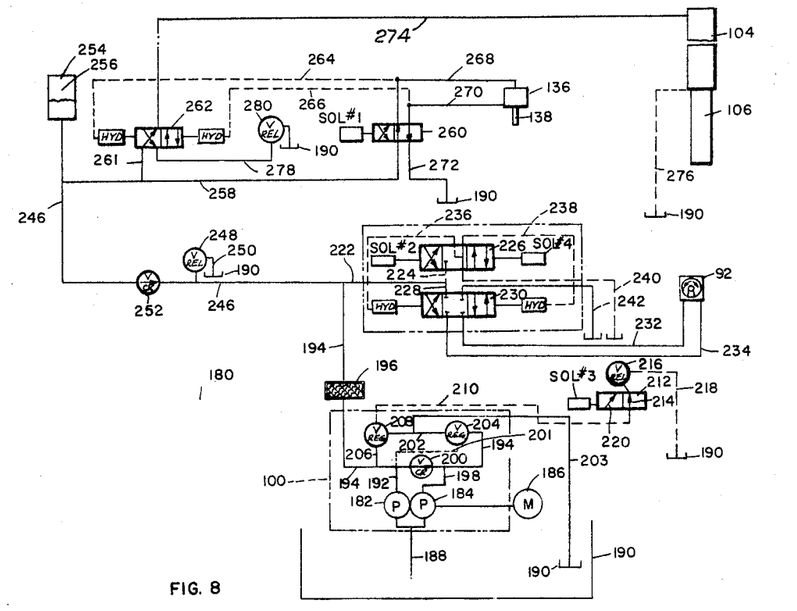
FIGURE 8 is a diagrammatic view of the hydraulic circuit in the machine of FIG. 1.

In the position of the valve 260 illustrated in FIG. 8, in which solenoid #1 is de-energized, fluid is supplied through the line 264 so as to move the hydraulically actuated valve 262 to its illustrated position and fluid is supplied through the line 268 to the cylinder 136 so as to move the piston rod 138 to its lower position corresponding to a valve open position of the parison valve assembly 128 (FIG. 6). When solenoid #1 is energized the valve body 260 is moved to the right as hown in FIG. 8 so that fluid from the conduit 258 will flow through the valve body 260 into the line 266 so as to move the valve body 262 to the left as viewed in FIG. 8, and into the line 270 so as to move the piston rod 138 up to close the parison valve assembly 128. Fluid flowing out of the cylinder 136 and the pilot passage 264 for the valve body 262 flows through the valve body 260 and a conduit 272 to the tank 190.

The valve body 262 is also connected by means of a conduit 274 to the upper end of the cylinder 104 having the piston rod 106. The lower end of the cylinder 104 is connected through a conduit 276 to the tank 190 so that fluid cannot be trapped therein. The valve body 262 is also connected by a conduit 278 having a pressure relief valve 280 therein to the tank 190, so as to at all times maintain a pressure on the plastic in the extruder 18 and the accumulator sleeve 110.

When solenoid #1 is de-energized, as shown in FIG. 8, so that the valve body 262 is in its illustrated position, fluid in the line 258, from both the pump unit 100 and the accumulator 254, flows through the body 262 and the conduit 274 to the upper end of the cylinder 104 so as to rapidly move the piston rod 106 downwardly to thereby provide for movement of the accumulator piston 108 downwardly so as to discharge heated plastic from the accumulator into the tubular member 42 which conveys this plastic to the die heads 38.

When solenoid #1 is energized, fluid from line 258 flows through valve body 260 to cylinder assembly 136 to move piston rod 138 upwardly and close parison valve assembly 128. Also, when solenoid #1 is energized, the valve body 262 is in a position moved to the left from that illustrated in FIG. 8, so that the conduit 258 is blocked at the valve body 262 and the upper end of the cylinder 104 is connected through the conduit 274, the valve body 262, the conduit 278, and the valve 280 with the tank 190. As a result, plastic being discharged from the extruder 18 will be forced upwardly in the sleeve 110 so as to lift the accumulator piston 108 to in turn lift the piston rod 106 and force fluid out of the cylinder 104 through the valve 280 into the tank 190.

To further facilitate an understanding of the operation of the machine 10, the air system for the machine 10, indicated generally at 282 in FIG. 9 in which a plastic article that has been blown is indicated at 284, will now be described. In the system 282, a conduit 286 is connected to a suitable source of air under pressure and supplies air to four conduits 288, 290, 292 and 294. The conduit 288 has a pressure regulator 296 therein which is set to limit the pressure in the conduit 288 to a predetermined pressure which in one embodiment of the invention is between 80 and 100 p.s.i. The conduit 288 also has a pressure regulator 298 therein which is set to limit the pressure in a conduit 300 connected to the pressure regulator 298 at a very low pressure which in one embodiment of the invention is between 1 and 5 p.s.i. The conduit 300 has a flow control valve 302 positioned therein and is connected to a two-position valve body 304. A conduit 306 extends between the valve body 304 and the conduit 288 at a position ahead of the pressure regulator 298.

Figure 9:
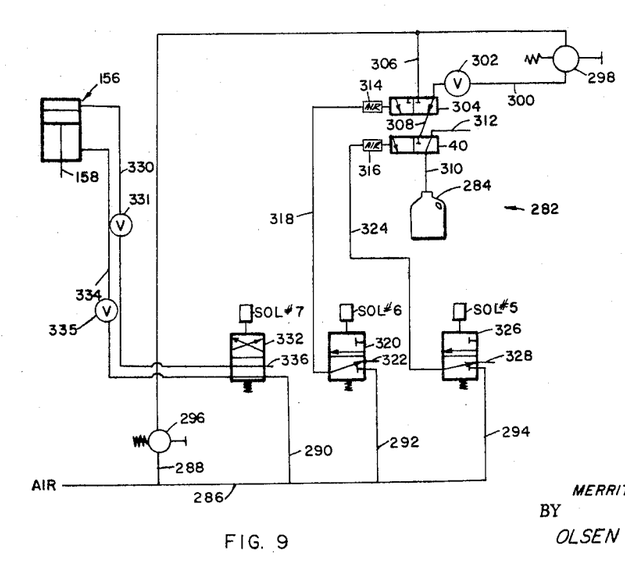
FIGURE 9 is a diagrammatic view of the pneumatic circuit in the machine of FIG. 1.

The valve body 304 is connected by three conduits 308, only one of which is shown, to the three-way valves 40, only one of which is shown in FIG. 9. Each of the three-way valves 40 is connected by a conduit 310, which is usually formed in the one of the die head assemblies 38 corresponding to the three-way valve 40, so that the conduit 310 communicates with the interior of the parison which is blown to form the plastic article 284. Each valve 40 is also connected to an exhaust conduit 312.

The valve 304 is air actuated and when no air is being supplied to the valve actuator 314, the valve body 304 is in the position shown in FIG. 9, and when air is being supplied to the actuator 314, the valve body 304 is in a position moved to the right as shown in FIG. 9 so that the conduit 300 is blocked at the valve body 304 and the conduit 306 is communicated through the valve body 304 with the conduit 308. Each of the valves 40 is likewise actuated by an air actuator indicated at 316, which when no air is being supplied thereto positions the valve 40 in the position illustrated in FIG. 9. When air is supplied to an actuator 316, the valve body 40 is moved to the right as shown in FIG. 9 so as to communicate the conduits 308 and 310 through the valve 40.

The actuator 314 is connected by conduit 318 to a valve 320, the position of which is controlled by a solenoid designated solenoid #6, which is connected to an exhaust conduit 322 and to the air conduit 292. The air actuator 316 is likewise connected by conduit 324 to a valve 326, the position of which is controlled by a solenoid designated solenoid #5, connected to an exhaust conduit 328 and the air conduit 294. When solenoid #5 is de-energized, as illustrated in FIG. 9, the air actuator 316 is connected through the valve 326 to the exhaust conduit 328. When solenoid #5 is energized, the valve 326 is moved downwardly to a position in which air under pressure from the line 286 can flow through the conduit 294, the valve 326 and the conduit 324 to the actuator 316 so as to move the valves 40 to the right as shown in FIG. 9. Likewise, when solenoid #6 is energized, valve 320 is moved downwardly so that air under pressure is supplied to conduit 292, through valve 320 and conduit 318 to air actuator 314 so as to move valve body 304 to the right as viewed in FIG. 9.

The cylinder 156 for the stripper assembly 152 is connected adjacent its upper end by a conduit 330 to a valve 332 and is connected adjacent its lower end by a conduit 334 to the valve 332. A solenoid, indicated as solenoid #7, controls the position of the valve 332 which is connected to the conduit 290 and an exhaust conduit 336. When solenoid #7 is de-energized, as shown in FIG. 9, conduit 330 is connected to exhaust conduit 336 and conduit 334 is connected to pressure conduit 290 so that the piston rod 158 is moved to its upper position in which the stripper brackets 176 are moved to their upper positions above the parisons being extruded at the die heads 38. When solenoid #7 is energized, so as to move valve 332 downwardly, as shown in FIG. 9, conduit 334 is connected with exhaust conduit 336 and conduit 330 is connected with pressure conduit 290 so that the piston rod 158 is quickly moved downwardly to move the stripper brackets 176 downwardly to strip the blown plastic articles from the die heads 38.

Operation

Figure 10:
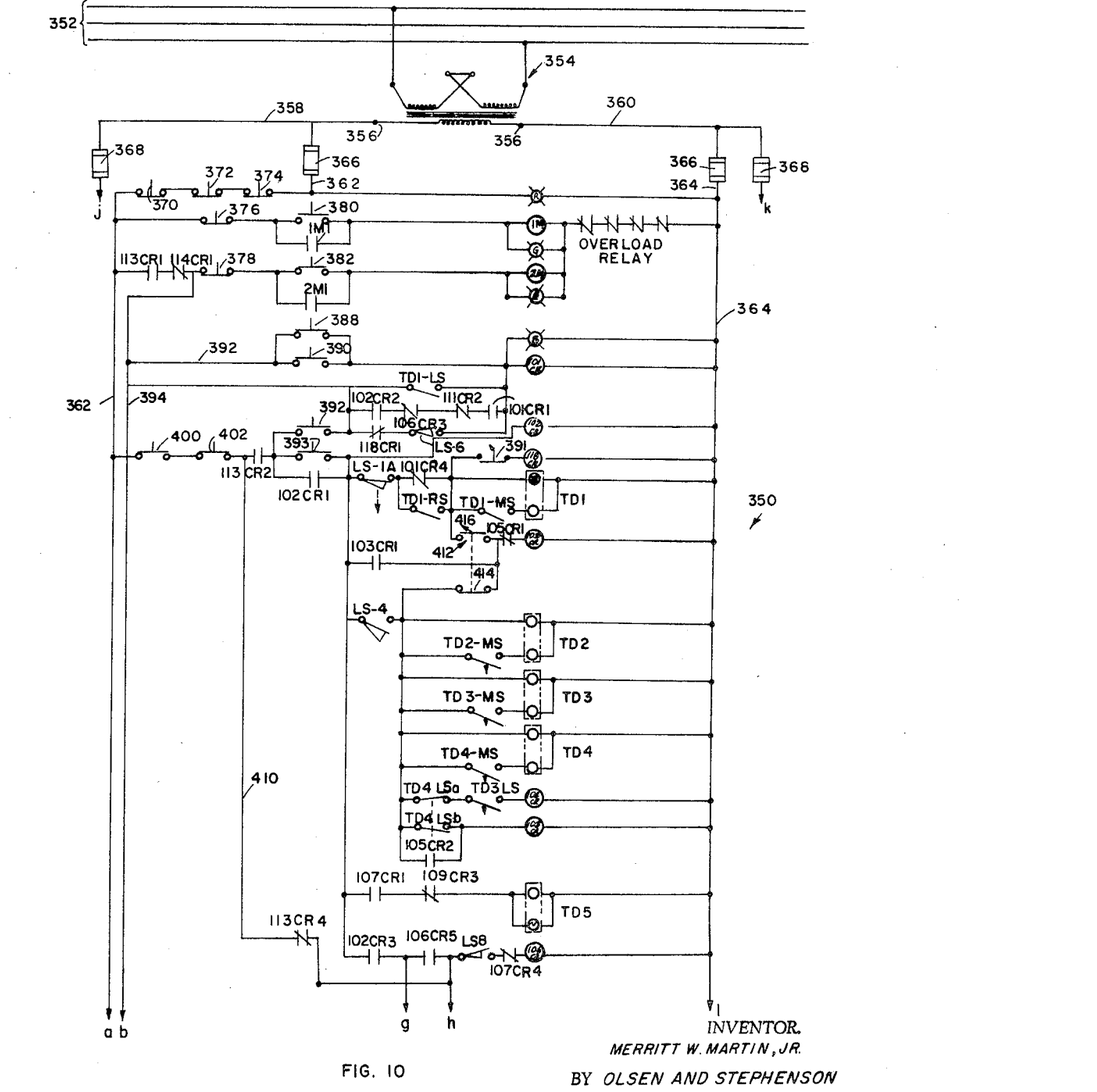
FIGURES 10, 11 and 12 are diagrammatic views of the electrical circuit in the machine of FIG. 1.

The operation of the machine 10 is controlled by an electrical control circuit, the components of which are mounted on the moving parts of the machine and on a control panel (not shown) mounted either on the machine main frame 12 or on a separate frame adjacent the machine 10. Three portions of the control circuit, indicated generally at 350, are illustrated separately in FIGS. 10, 11 and 12 for purpose of clarity, since the circuit 350 is too large to illustrate in a single view. A three-phase supply line 352 is connected to a transformer 354 having terminals 356 connected to leads 358 and 360. The leads 358 and 360 are connected through lines 362 and 364, having fuses 366 therein, to the portions of the control circuit 350 illustrated in FIGS. 10 and 11. The portion of the circuit 350 shown in FIG. 10 is connected to the portion shown in FIG. 11 at the points indicated as a, b, g, h, and i. The leads 358 and 360 are also connected through lines j and k, having fuses 368 therein, with the portion of the circuit 350 shown in FIG. 12.

Figure 11:
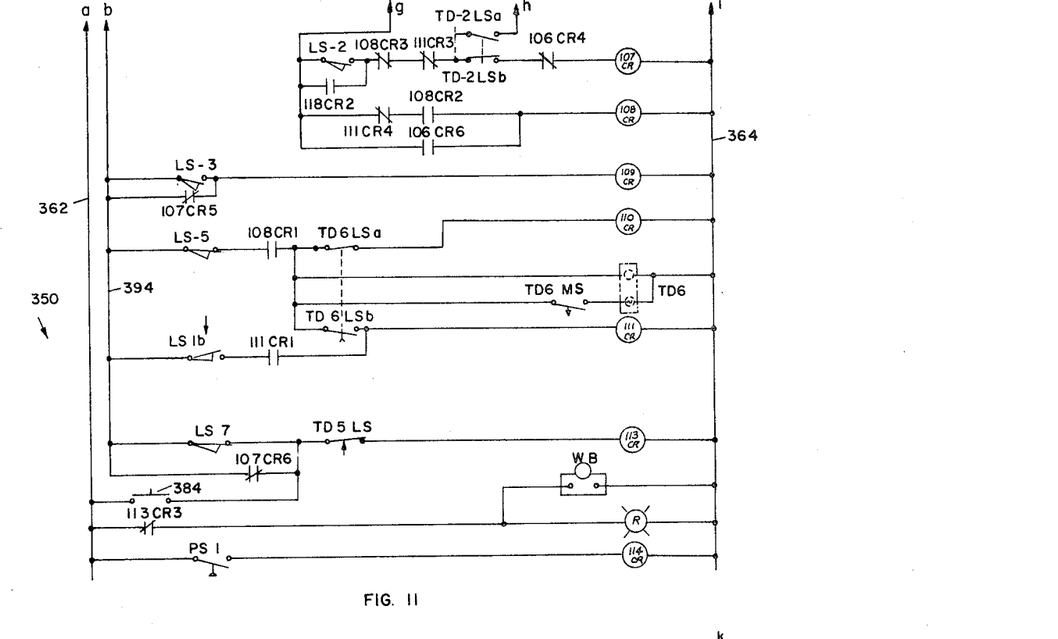
Figure 12:
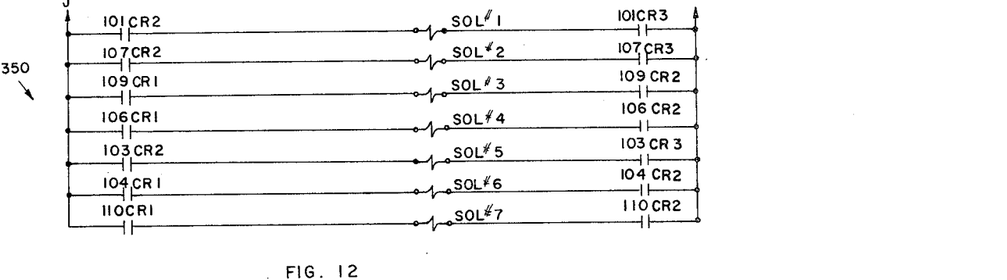

Assume that the mold sections 46 are open so that the platens 48, 50 and 60 are in the positions shown in FIG. 3, the stripper assembly 152 is retracted, the parison valve assembly 128 is open and the plunger 108 is down. In this condition of machine 10, limit switches LS–5, 7 and 9 are closed, LS–2, 3, 4, 6 and 8 are open, the contacts LS–1A for switch LS–1 are closed and contacts LS–1B are open as shown in FIGS. 10 and 11. The machine 10 is started by closing three emergency stop switches 370, 372 and 374 which are in series in the line 362. The switch 370 is located on the main control panel (not shown), the switch 372 is located on one side of the machine within reach of an operator viewing the movement of the mold sections 46, and the stop switch 374 is located at a corresponding position on the opposite side of the machine. Switches 376 and 378 are closed and motor start switches 380 and 382 are likewise closed. When switch 380 is closed, a relay 1M for the pump motor 186 is energized so as to close normally open locking contacts 1M1, and start motor 186. A light G in parallel with the motor relay 1M is lit when the relay is energized. When the switch 382 is closed a relay 2M for the extruder motor 24 is energized to start motor 24, close the locking contacts 2M1 for relay 2M and also light an indicating light E. To provide for energizing of relay 2M in response to closing of start switch 382, a manual safety switch 384 (FIG. 11) is first momentarily closed to energize control relay 113CR to close normally open contacts 113CR1, 2 and 3 and open normally closed contacts 113CR4. Switch 384 then remains open during automatic operation of machine 10.

Either one of a pair of manual switches 388 or 390, which are connected in parallel, are then closed. The switches 388 and 390 are in a line 392 which is connected to a line 394 that is connected to the main lead 362 through the closed contacts 113CR1 and 114CR1. When either of the switches 388 or 390 is closed, control relay 101CR is energized and an indicating light B is lit to visually indicate energizing of the relay 101CR. Relay 101 CR has three sets of normally open contacts 101 CR1, 2 and 3 and one set of normally closed contacts 101CR4. Opening of contacts 101CR4 prevents energizing of TD1 timer at this time. When contacts 101CR2 and 3 are closed, solenoid #1 (FIG. 8) is energized so that the parison shutoff valve 140 is moved upwardly to its closed position and the top of accumulator cylinder 104 is connected to the tank 190. Plastic is fed to the extruder 18 which feeds heated plastic in a semi-fluid condition to the accumulator sleeve 110 so as to move the plunger 108 upwardly so that the rod 116 releases LS–1 to provide for opening LS–1A and closing LS–1B. When sufficient time has elapsed for the extruder 18 to fill the accumulator sleeve 110, but before LS–9 is actuated, the switch 388 or 390 which was closed is released to deenergize 101CR and solenoid #1 and thereby open the parison valve 140 so that the plunger 108 starts downwardly and parisons start to be formed at the die heads 38.

The machine 10 can be operated with a selector switch 391 open or closed depending on the product desired. First assume that switch 391 is open.

Either one of a pair of parallel connected automatic cycle switches 392 or 393 is then manually held closed. When either of the automatic cycle switches 392 or 394 is closed, control relay 102CR is energized and normally open locking contacts 102CR1 are closed so that the switch 392 or 394 can be opened without de-energizing the relay 102CR. This relay is in series with the normally open contacts 113CR2, which are now closed since 113CR is energized, and switches 400 and 402 which are mounted on the machine so that they are closed when Plexiglas safety panels (not shown), which are mounted on opposite sides in the main frame 12 so as to prevent a workman from putting his hand between the mold sections 46, are closed. Energizing of control relay 102CR also results in closing of normally open contacts 102CR2, which are in series with 101CR, and closing of normally open contacts 102CR3 which are in series with 107CR, to subsequently enable closing of the molds.

When the accumulator plunger 108 has completed its downward movement, the shoulder 120 on the rod 116 engages limit switch LS–1 to close contacts LS–1A which are spring biased toward an open position, and to open contacts LS–1B which are spring biased toward a closed position; thereby energizing time delay unit TD1, by completing a circuit through normally closed contacts 101CR4 which are now closed, which results in immediate closing of normally open relay switch TD1–RS and normally open motor switch TD1–MS. Opening of contacts LS–1B keeps 111CR de-energized so that contacts 111CR3 will be closed to permit subsequent energizing of 107CR. Following a predetermined time delay after time delay unit TD1 is energized, normally open load switch TD1–LS also closes. Shortly thereafter, TD1–MS opens to de-energize the motor for TD–1, but the coil for TD–1 remains energized to maintain TD1–LS closed until the circuit to TD–1 is opened, all of which is conventional use of such a timer unit.

As soon as TD1–LS closes, 101CR is again energized to in turn energize solenoid #1 to provide for closing of the parison valve 140. Prior to closing of TD1–LS, 101CR cannot be energized because of normally open contacts 101CR1, since the molds are in the FIG. 3 position in which LS–6 is opened. The time delay involved between actuation of LS–1, in response to bottoming of the accumulator discharge plunger, and closing of TD1–LS may be set anywhere between 0 and 3 seconds to assure a wiping action on the lower end 109 of accumulator plunger 108 by plastic from extruder 18. As shown in FIG. 5, plunger end 109 is concavely rounded to insure this wiping action which prevents the adherence of plastic to the plunger. Such plastic tends to burn and discolor the blown plastic articles. As soon as the parison valve is closed, plastic flows into the accumulator sleeve 110 so as to raise the plunger 108 and the rod 116 releases LS–1 so that contacts LS–1A are opened and LS–1B are closed.

When the parison valve plunger 140 moves upwardly to its closed position (FIG. 6) the shoulder 150 on the rod 146 closes LS–2. On closing of LS–2, relay 107CR is energized since contacts 102CR3 are now closed. This relay has three normally open sets of contacts 107CR1, 107CR2 and 107CR3 and three sets of normally closed contacts 107CR4, 107CR5 and 107CR6. On closing of the normally open contacts 107CR2 and 107CR3, solenoid #2 is energized. As shown in FIG. 8, when solenoid #2 is energized, valve body 226 is moved to the right so that fluid from the conduit 224 passes through the conduit 238 so as to move valve body 230 to the left and thereby provide for a flow of fluid through conduit 228, valve body 230 and conduit 234 to the hydraulic motor unit 92 so as to move the shaft 90 in a counterclockwise direction. As shown in FIG. 3, such movement of the shaft 90 moves the toggle mechanism toward an aligned position to thereby move the mold sections 46 toward each other. During such movement, fluid from both of the pumps 182 and 184 is being supplied at low pressure to the hydraulic motor unit 92. When the molds start to close, switches LS–5 and LS–6 are released so that LS–5 opens and LS–6 closes and switch LS–8 is released so that it closes.

Also in response to closing of LS–2, time delay unit TD5 is energized since the normally open contacts 107CR1 are now closed and normally closed contacts 109CR1 remain closed since relay 109CR is de-energized when normally closed contacts 107CR5 are opened. In the event TD5, which is hereinafter referred to as the low pressure safety timer, times out, TD5–LS opens so that 113CR is de-energized, safety reset switch 384 now being open, so that contacts 113CR1 are opened, extruder motor relay 2M is de-energized and the cycle is interrupted. Contacts 113CR2 open to de-energize 102CR and de-energize 107CR, which results in closing of normally closed contacts 107CR4 to thereby energize mold opening relay 106CR having normally open contacts 106CR1 and 106CR2. A circuit is completed through 106CR at this time through line 410 having normally closed contacts 113CR4 therein, which at this time are closed because relay 113CR is de-energized. When 106CR1 and 2 close solenoid #4 is energized to reverse the direction of rotation of shaft 90 by motor unit 92 so that the mold sections 46 are moved apart.

The machine 10 then remains in an idle position, with the molds open, and a circuit completed through a warning light R and a warning bell WB when normally closed contacts 113CR3 close, until the circuit 350 is again actuated as previously described to automatically cycle the machine 10. The purpose of the low pressure safety timer TD5 is to stop the machine 10 in the event the mold sections 46 encounter any obstruction which prevents them from moving to tightly closed positions within the time period for which the timer TD5 is set. Such an obstruction occurs when a blown plastic article is not removed from a position between the mold sections 46 or when an improperly formed parison is formed at a die head 38 so as to prevent the mold sections 46 from closing tightly. In either of these cases, the formation of waste material is prevented by shutting down the machine 10 until the die heads 38 are cleared. The pressure developed by the hydraulic pump unit 100 is insufficient to move the mold sections 46 into engagement if any obstruction is encountered, since oil is free to flow through the relief valve 216 to the tank 190, and the 50–200 p.s.i. range for the valve 216 is selected because in this pressure range the motor unit 92 will sense a plastic obstruction between the mold sections 46.

In the event no obstruction is encountered, the mold sections 46 are moved by the toggle mechanism to positions in which they touch or practically touch, at which time the arm 98 on the shaft 90 engages limit switch LS–3 and closes it prior to the time TD5 times out. During normal operation of the machine 10, LS–3 is closed before TD5 times out.

On closing of LS–3, relay 109CR is energized to thereby close normally open contacts 109CR1 and 109CR2, to energize solenoid #3, and open normally closed contacts 109CR3. On opening of contacts 109CR3, TD5 is de-energized so that TD5–LS does not open. On energizing of solenoid #3, valve body 212 is shifted to the right as viewed in FIG. 8 so as to close the conduit 210. In response to closing of conduit 210, the flow of fluid through valve 208 to tank conduit 202 is stopped and the pressure developed in conduit 194 is increased sufficiently to open valve 204, by virtue of the pressure in pilot line 201. The check valve 200 closes and the fluid from the pump 184 is then discharged to the tank 190 through the conduit 203. The pump 182 then develops a high pressure in the conduit 194, since the pressure is limited only by the settings of valves 208 and 248, and this high pressure fluid is transmitted to the hydraulic motor unit 92 so as to move the toggle assembly to a substantially horizontal position in which the mold sections 46 are squeezed tightly against each other with such force that the tie rods 66 may be stretched. Excess hydraulic fluid flows through relief valve 248 or valve 208 to tank 190. Furthermore, this high pressure is transmitted through the line 246 to the accumulator 254 so as to compress the gas therein to later provide for a quick high pressure discharge of fluid from the accumulator 254 to in turn provide for a rapid downward movement of the piston rod 106 which ejects plastic from the accumulator assembly 102.

When the mold sections 46 are forced against each other, the switch actuating arm 98 moves clockwise a distance sufficient to close LS–4, and keep LS–3 closed. A switch actuating bracket 98a on the terminal end of arm 98 is adjusted so that switch LS–3 is actuated prior to actuation of switch LS–4, or the switches may be offset sufficiently to accomplish this result. In response to closing of LS–4, the time delay units TD2, TD3 and TD4 are energized, since contacts 113CR2 are closed, to close switches TD2–MS, TD3–MS, and TD4–MS and start the timers timing. Closing of LS–4 also results in energizing of preblow relay 103CR in the event a preset control switch 412 is in the position shown in FIG. 10 in which its contacts 414 are closed, and its contacts 416 are open. Switch 412 can be set in a second position in which the contacts 416 are closed and the contacts 414 are open. In such case, preblow relay 103CR is energized on closing of switch contacts LS–1A and contacts TD1–RS. Whenever 103CR is energized, normally open locking contacts 103CR1 are closed and normally open contacts 103CR2 and 103CR3 are closed to energize solenoid #5 (FIG. 9). In response to energizing of solenoid #5, air is supplied to the actuator 316 so as to move the valve units 40 to the right as viewed in FIG. 9 to provide for a supply of low pressure air through the lines 300, 308 and the valves 40 to the parisons.

In the event the switch 412 is set so that the contacts 416 are closed, preblow air is supplied to the parisons prior to closing of the mold so that a pre-pinch mechanism (not shown) must be employed to close the lower ends of the parisons prior to closing of the mold so that the preblow air is effective to partially expand the parisons. In the event the parisons are to be preblown after the molds are closed, switch 412 is set as shown in FIG. 10 so that on closing of LS–4, preblow air is supplied to the parisons so as to partially expand the parisons.

Timer TD3 is set to time out before the timers TD2 and TD4 and is set to time out at the end of a time period between 0 and 6 seconds. When the timer TD3 times out, and it is set to time out depending on the amount of preblow air which it is desired to supply to the parisons, TD3–LS closes to thereby energize relay 104CR having normally open contacts 104CR1 and 104CR2 which close to energize solenoid #6. When solenoid #6 is energized, valve body 304 is shifted so that high pressure air from the line 306 is supplied through the valve body 304 to the conduit 308 which communicates through the valves 40 with the parisons suspended from the die heads 38 to thereby expand the parisons into conformity with the mold cavities formed in the mold sections 46.

Timer TD4 is set to time out a predetermined time period after timing out of timer TD3. When TD4 times out, one set of load switch contacts TD4–LS*a* open to thereby de-energize 104CR to in turn de-energize solenoid #6 and provide for a return of the valve body 304 to the position shown in FIG. 9 so that the supply of blowing air to the parisons is discontinued. When TD4 times out another set of load switch contacts TD4–LS*b* close to energize relay 105CR. When 105CR is energized, locking contacts 105CR2 close and a set of normally closed contacts 105CR1 are opened so that relay 103CR is de-energized to de-energize solenoid #5 and provide for movement of the valves 40 to the position shown in FIG. 9 in which air in the blown articles in the mold sections 46 is exhausted through the exhaust conduits 312.

Timer TD2 is set to time out immediately following timing out of timer TD4. When this timer times out the load switch contacts TD2–LS*a* are closed to energize 106CR, and the load switch contacts TD2–LS*b* are opened to de-energize 107CR so that the contacts 107CR4 in series with 106CR close. Solenoid #2 is de-energized when 107CR is de-energized. When 106CR is energized, solenoid #4 is energized to reverse the direction of rotation of the shaft 90 and provide for movement of the platens 48 and 50 away from each other so as to move the mold sections 46 toward positions in which they will be on opposite sides of the blown articles. As soon as arm 98 moves out of engagement with LS–3 and LS–4, these switches open; and when LS–4 opens 105CR is de-energized. Also, when 106CR is energized, normally closed contacts 106CR3 and 4 are opened and normally open contacts 106CR5 and 6 are closed. On closing of contacts 106CR6, relay 108CR is energized to close normally open contacts 108CR1 which are in series with limit switch LS–5. Normally open locking contacts 108CR2 are also closed and normally closed contacts 108CR3 are opened.

A pair of rods 420 and 422 are adjustably mounted in a side-by-side relation on the platens 60 so that they will actuate LS–5 and LS–6, respectively, at a time immediately prior to movement of the mold sections 46 to fully moved apart positions. The rods 420 and 422 may be adjusted to provide for any desired sequence actuation of LS–5 and LS–6. When the platens 48 and 50 have been moved apart sufficiently to move the platen 60 to a position in which the rod 420 thereon closes switch LS–5 (FIG. 3), relay 110CR is energized to close normally open contacts 110CR1 and 110CR2 to thereby energize solenoid #7. As shown in FIG. 9, when solenoid #7 is energized the stripper piston rod 158 is moved rapidly downwardly under the action of high pressure air to thereby move the stripper bracket 176 downwardly so that it engages the blown plastic articles suspended on the die heads 38 to strip these articles off the die heads so that they fall downwardly between the mold sections 46 onto a suitable conveyor. Closing of switch LS–5 and contacts 108CR1 also results in energizing timer TD6 having motor switch TD6–MS which is immediately closed to start the timer. When the timer TD6 times out, following expiration of a predetermined time sufficient for the air cylinder assembly 156 to move the stripper bracket 176 downwardly a desired distance, the timer load switch contacts TD6–LS*a* open and the contacts TD6–LS*b* close. As soon as TD6–LS*a* opens 110CR is de-energized to de-energize solenoid #7 and shift valve body 332 to its position illustrated in FIG. 9 in which the stripper piston rod 158 is moved upwardly to return the stripper bracket 176 to its upper position in which it will not interfere with formation of a subsequent parison. Safety limit switch LS–7 opens when bracket 176 is moved downwardly. In the event bracket 176 does not return to again close LS–7 the cycle is interrupted as soon as 107CR is energized to open contacts 107CR6. Relay 107CR is the mold closing relay, so in the event LS–7 is open when relay 107CR is energized, 113CR is deenergized to stop extruder 18 and open the molds, as previously described. This arrangement of LS–7 and contacts 107CR6 provides for stopping the extruder 18, in the event it runs out of plastic, as follows:

In the event the extruder 18 is out of plastic, plunger 108 will not be lifted by plastic being forced into sleeve 110 when 101CR is de-energized, so LS–1A remain closed. As a result, when 107CR is subsequently energized to start the platens 48 and 50 moving toward each other, contacts 107CR6 are opened, and in the event LS–7 is also open at this time 113CR is de-energized to stop the cycle as previously described. Manually adjustable flow control valves 331 and 335 are interposed in the conduits 330 and 334 connected to the stripper cylinder assembly 156, and these valves 331 and 335 are adjusted to provide for an upward movement of stripper bracket 176 at a slower speed than the speed at which it is moved downwardly. This adjustment is such that in the event the accumulator sleeve 110 is empty, the relay 107CR is energized prior to completion of the upward movement of bracket 176 to close LS–7.

When TD–6 times out so that contacts TD6–LS*b* close, relay 111CR is energized to close locking contacts 111CR1 and open normally closed contacts 111CR2 and 111CR3 to prevent energizing of 101CR until LS–6 is closed and prevent energizing of 107CR until 111CR is de-energized. When normally closed contacts 111CR4 are opened 108CR cannot be energized through 108CR2, and when the molds have been fully opened (FIG. 3) LS–8 is opened by arm 96 to de-energize 106CR so that contacts 106CR6 are opened to de-energize 108CR. When 106CR is de-energized, solenoid #4 is de-energized so that valve body 226 moves to a neutral position so that rotation of shaft 90 is stopped.

When the mold sections 46 have been moved to positions in which the rod 422 on the platen 60 engages the switch LS–6 so as to open it 101CR is de-energized, to provide for opening of the parison valve 140 and a discharge of plastic by plunger 108. When plunger 108 bottoms, LS–1A are closed to energize TD1 and the above described cycle is repeated automatically. As shown in FIG. 10, LS–6 is in parallel with 106CR3 and 111CR2 one or the other of which is always open when LS–6 is closed to prevent opening of the parison valve 140 and discharge of plastic from the accumulator assembly 102 and the extruder 18 to the die heads at any time other than when the molds are fully opened so that the switch LS–6 is opened. The relay 111CR is de-energized as soon as the accumulator assembly 102 is discharged to open contacts LS–1B. It is to be noted that 109CR is energized, to keep solenoid #3 energized so that high pressure fluid is supplied by pump 100 whenever LS–3 is closed or contacts 107CR5 are closed (FIG. 11) by de-energizing 107CR. One of these contingencies is present at all times except when the molds are closing, at which time 107CR is energized, and until LS–3 is closed by touching of the molds.

A pressure switch PS1 is associated with a pressure gauge 424 (FIG. 1) which indicates the pressure of the plastic in the extruder 18. In the event this pressure exceeds a predetermined pressure PS1 closes energizing 114CR to thereby open normally closed contacts 114CR1 to de-energize the extruder motor relay 2M and interrupt the cycle.

Now assume that the machine 10 is to be cycled with the selector switch 391 closed. Operation of the machine 10 with the selector switch 391 closed affects the operation of the above-described cycle as follows. When limit switch contacts LS-1A are closed, by bottoming the accumulator plunger 108, control relay 118CR which is in series with selector switch 391 is energized to open normally closed contacts 118CR1 which are in series with LS-6 and close normally open contacts 118CR2 which are in parallel with LS-2. At the time contacts 118CR2 are closed 107CR will be energized so that the molds will close prior to movement of the parison valve plunger 140 to a position in which LS-2 is closed. It will be recalled that in the cycle in which selector switch 391 is opened 107CR is not energized, so that the molds do not start to close, until after TD1 has timed out to energize 101CR to in turn cause movement of the plunger 140 to its closed position.

As a result, in the cycle in which the selector switch 391 is closed, the mold sections 46 begin moving toward each other prior to completion of the forming of the parisons at the die heads 38, while in the cycle in which the selector switch 391 is opened, the parisons are completely formed before the molds begin to close. In forming some plastic articles, one cycle is preferred and in forming other plastic articles, the other cycle is preferable for the following reasons. When a parison is formed at a die head 38, it tends to expand or bulb radially outwardly at the extrusion nozzle, by virtue of the discharge pressure on the plastic at the die head, as explained in detail in copending application, Serial No. 110,501, filed May 16, 1961, and now Patent No. 3,102,679. However, if the parison is permitted to hang on the die head for any significant period of time, the weight of the parison provides for an axial stretching of the parison and a resultant necking down of the bulbed out upper portion of the parison. If this bulbing out characteristic of the upper end of the parison is to be utilized in the formation of the blown plastic article, as is the case when the article is a bottle having a handle located adjacent the upper end of the bottle, it is desirable to close the mold sections 46 on the parison before it has hung on the die head long enough to neck down at the upper end.

Consequently, in such a situation it is desirable to close selector switch 391 and adjust timer TD1 so that the mold sections 46 close tightly on the parisons at the same time that the formation of the parisons has been completed, or a fraction of a second prior to timing out of TD1 to move the parison valve plunger 140 to a closed position. This latter condition permits the extruder 18 to force plastic out of the dies 38 for a fraction of a second following tight closing of the mold sections 46 which results in the formation of an annular ring or washer of plastic material between each die head 38 and the upper end of the mold sections 46. This ring of plastic material between each extrusion die and the mold sections 46 functions to insulate the heated die head from the cooled mold sections. Without the insulating plastic ring, there is a tendency for the extrusion dies 38 to become cooled at their discharge ends which adversely affects the formation of the next parisons. In addition, by closing the mold sections 46 prior to necking down of the parisons, so that their wall thicknesses are reduced, any danger of blowing air leaking through the parisons at their necked down upper ends is also eliminated to also eliminate the possibility of the formation of a subsequent parison with a ragged lower end.

In the event the plastic articles to be blown at the die heads 38 are of other types, such as a bottle having a large body and a small neck at the upper end, a necked down parison may be advantageously utilized. In such a case, selector switch 391 is moved to an open position so that 107CR is not energized to start the mold sections 46 moving toward each other until TD1 has timed out to close the parison valve plunger 140 and terminate the parison forming portion of the cycle.

The purpose of the normally closed contacts 118CR1 in series with LS-6 is to prevent energizing of 101CR, to move the parison valve plunger 140 to a closed position, until TD1 times out, in case LS-6 has not yet opened, which is essential in the operation of the machine 10 with the selector switch 391 closed.

Summarizing, each cycle of the machine 10 consists of the following sequence of operations, and the machine is automatically recycled by the circuit 350:

(1) The parison valve plunger 140 moves upwardly to a closed position and the accumulator assembly 102 begins filling with plastic from the extruder 18. While the accumulator assembly 102 is filling with plastic, the following operations take place.

(2) The mold carrying platens 48 and 50 start moving toward each other from their moved apart positions in which the toggle assembly is in the position shown in FIG. 3 With the selector switch 391 open, the hydraulic pump unit 100 cannot begin to move the platens 48 and 50 toward each other unless LS-2 is closed, signifying that the parison valve 140 is in its closed position. With switch 391 closed, the platens 48 and 50 start moving toward each other as soon as plunger 108 bottoms to close contacts LS-1A. The platens 48 and 50 commence their movement toward each other under the action of low pressure from the hydraulic pump unit 100.

(3) In the event TD5 times out, meaning that an obstruction exists between the mold sections 46 which prevents the mold sections 46 from being moved by the platens 48 and 50 to positions in which they touch or nearly touch, the extruder 18 is shut off and the mold sections 46 are moved away from each other by the platens 48 and 50.

(4) In the event the mold sections 46 are moved to their touching or nearly touching positions prior to timing out of the timer TD5, which event is indicated by closing of LS-3, the valve body 212 is moved to a position blocking the conduit 210 so that the pump unit 100 operates to supply high pressure hydraulic fluid to the motor unit 92 so as to force the mold sections 46 tightly against each other. The toggle assembly is at this time in its extreme unfolded position so that the mold sections 46 are securely locked in these positions. (The time at which pre-blow air is supplied, depends on the pre-set condition of switch 412).

(5) Limit switch LS-4 is actuated to provide for a supply of high pressure blowing air to the interior of the parisons at the die heads 38.

(6) After the timer TD4 times out, air is exhausted from the parisons.

(7) When the timer TD2 times out, the hydraulic motor unit 92 is operated to rotate the shaft 90 in a reverse direction so as to move the molds apart under the action of the high pressure fluid. Since the arm 80 which actuates the toggle assembly begins its movement from a horizontal position, during opening of the molds, the component of each increment of movement of the arm 80 in a horizontal direction is initially extremely small. As a result, the mold sections 46 are moved away from each other at a very slow but progressively increasing speed. As a result, there is no tendency for a blown plastic article to be pulled off a die head 38 with a mold section 46. Such a result is very desirable since it prevents possible malfunction of the machine due to a plastic article adhering to one of the mold sections 46.

(8) When the platens have been moved to positions corresponding to a position of the toggle assembly shown in FIG. 3, or a position close to the position, in which the mold sections 46 are spaced sufficiently far apart to provide clearance for a downwardly falling blown plastic article, LS-5 is actuated to provide for rapid downward movement of the stripper bracket 176 so as to strip the blown plastic articles from the die heads 38, following which the bracket is slowly returned.

(9) Switch LS-6 is opened either a fraction of a second before or right after LS-5 is actuated to provide for movement of the parison valve plunger 140 to an open position and to provide for downward movement of the accumulator plunger 108 so as to provide for a discharge of heated plastic from the accumulator 102 and the extruder 18 into the passage 42 for flow to the die heads 38. The time involved in the cycle between closing and opening of the parison valve 140 determines the extent to which the accumulator sleeve 110 is filled with plastic. In the event of a malfunction of the machine 10 so that this lapse of time is greater than a predetermined time period, the sleeve 110 overfills so that the shoulder 122 on the rod 116 actuates the limit switch LS–9. This switch LS–9 is connected in the control circuit 350 in a conventional manner, which is therefore not illustrated, so as to open a set of contacts for a clutch (not shown) for the extruder motor 24 so as to discontinue operation of the extruder 18.

(10) When the mold sections 46 have been moved fully apart (FIG. 3), the switch LS–8 is opened so that the hydraulic motor unit 92 is actuated to stop rotation of the shaft 90 to discontinue further movement of the platens 48 and 50 in a direction to move the mold sections 46 apart.

It will be understood that the method and apparatus for blow molding plastic articles which are herein disclosed and described are presented for purposes of explanation and illustration and are not intended to indicate limits of the invention, the scope of which is defined by the following claims.

What is claimed is:

1. In a blow molding machine having a frame, first and second horizontally spaced mold carrying platens slidably mounted on said frame for substantial horizontal reciprocal movement toward each other to "mold closed" positions and away from each other to "mold open" positions, a member slidably mounted on said frame in a spaced relation with said platens such that said second platen is between said first platen and said slidable member, means rigidly connecting said first platen and said slidable member, shaft means disposed between said second platen and said slidable member, reversible hydraulic motor means connected in a driving relation to said shaft means, toggle means connected intermediate the ends thereof to said shaft means and at the ends thereof to said second platen and said slidable member, said shaft being operable on rotation in one direction to substantially straighten said toggle mechanism so as to move said second platen and said slidable member away from each other and thereby move said platens to mold closed positions, and said shaft being operable on rotation in an opposite direction to move said toggle mechanism out of a substantially straight position to thereby move said platens toward "mold open" positions, a hydraulic circuit for supplying fluid to said motor means, valve means in said circuit operable in one position to limit the pressure of fluid supplied to said motor means to a predetermined low pressure, control means for said valve means operable to move said valve means to said one position during movement of said platens toward "mold closed" positions, switch means, switch actuating means on said shaft means operable in a predetermined position of said shaft means corresponding to a position of said platens between said "mold open" and "mold closed" positions, and means responsive to actuation of said switch means for operating said control means to move said valve means out of said one position.

2. In a blow molding machine having a frame, first and second horizontally spaced mold carrying platens slidably mounted on said frame for substantial horizontal reciprocal movement toward each other to "mold closed" positions and away from each other to "mold open" positions, a member slidably mounted on said frame in a spaced relation with said platens such that said second platen is between said first platen and said slidable member, means rigidly connecting said first platen and said slidable member, shaft means disposed between said second platen and said slidable member, reversible hydraulic motor means connected in a driving relation to said shaft means, toggle means connected intermediate the ends thereof to said shaft means and at the ends thereof to said second platen and said slidable member, said shaft being operable on rotation in one direction to substantially straighten said toggle mechanism so as to move said second platen and said slidable member away from each other and thereby move said platens to mold closed positions, said shaft being operable on rotation in an opposite direction to move said toggle mechanism out of a substantially straight position to thereby move said platens toward "mold open" positions, a hydraulic circuit for supplying fluid to said motor means, valve means in said circuit operable in one position to limit the pressure of fluid supplied to said motor means to a predetermined low pressure, control means for said valve means operable to move said valve means to said one position during movement of said platens toward "mold closed" positions, switch means, switch actuating means on said shaft means operable in a predetermined position of said shaft means corresponding to a position of said platens between said "mold open" and "mold closed" positions, means responsive to actuation of said switch means for operating said control means to move said valve means out of said one position, timer means actuated in response to starting movement of said platens toward "mold closed" positions, and means responsive to timing out of said timer means prior to actuation of said switch means for reversing the direction of rotation of said shaft means.

3. In a blow molding machine having a frame, a plasticizer on said frame, a die head on said frame, passage means connecting said plasticizer and said die head, a plastic accumulator positioned in communication with said passage means, a shutoff valve in said passage means between said accumulator and said die head, a pair of end platens and a center platen mounted on said frame below said die head for substantially horizontal reciprocal movement, a pair of mold sections mounted on said center platen and one of said end platens so that on movement of said mold carrying platens toward each other to engage said mold sections at least one mold cavity is formed, means rigidly connecting said end platens, substantially horizontal shaft means disposed between said center platen and the other one of said end platens, reversible motor means for rotating said shaft means, an arm secured intermediate its ends to said shaft means, a pair of substantially parallel links, one of said links being pivotally connected to and extending between one end of said arm and said other end platen, the other one of said links being pivotally connected to and extending between the other end of said arm and said center platen whereby on rotation of said shaft in one direction to position said arm and said links in substantially horizontal alignment said center platen and said other end platen are moved apart and said mold carrying platens are moved toward each other to engage the mold sections thereon, and on rotation of said shaft in an opposite direction to move said arm and said links out of alignment said mold carrying platens are moved away from each other, means for discharging said accumulator on opening of said shutoff valve, first switch means on said main frame, switch actuating means on said shaft means, means responsive to actuation of said first switch means for reversing said motor means to provide for movement of said platens to alternately engage and space said mold sections, second switch means on said main frame, means for supplying air to said mold cavity in response to actuation of said second switch means, means secured to said shaft means for actuating said switch means, said second switch means being positioned for actuation when said arm and said links are in substantially horizontal alignment, and means responsive to movement of said platens to positions to space said mold sections for opening said shutoff valve.

4. In a blow molding machine having a main frame, a plasticizer on said main frame, a die head on said main frame adapted to form at least one tubular parison on movement of plasticized material therethrough, mold sections adjacent said die head, means for moving said mold sections between mold forming positions and spaced apart positions, passage means conecting said plasticizer and said die head, an accumulator communicating with said passage means, said accumulator having a reciprocal plunger operable on movement in one direction to discharge material from said accumulator into said passage means, said plunger being movable to a discharge position in which substantially all of the material in said accumulator is discharged therefrom, a stripper bracket mounted adjacent to said die head for movement in one direction from an out of the way position to strip blown plastic articles from said die head and in an opposite direction from a stripping position to said out of the way position, a safety switch, means attached to said bracket closing said safety switch in the out of the way position of said bracket, limit switch means closed in response to movement of said plunger to said discharge position, and control circuit means connecting said safety and limit switches and operable to terminate operation of said plasticizer in response to actuation of said limit switch when said safety switch is open.

References Cited by the Examiner

UNITED STATES PATENTS

| | | | |
|---|---|---|---|
| 1,890,802 | 12/1932 | Apple | 18—12 |
| 2,372,833 | 4/1945 | Jobst | 18—30 |
| 2,392,203 | 1/1946 | Tucker | 18—30 |
| 2,393,549 | 1/1946 | McCreery | 18—42 XR |
| 2,588,066 | 3/1952 | Weisberg | 18—16 |
| 2,831,214 | 4/1958 | Eyles et al. | 18—30 |
| 2,923,973 | 2/1960 | Ninneman. | |
| 2,950,501 | 8/1960 | Harkenrider | 18—30 |
| 2,978,745 | 4/1961 | Langecker | 18—5 |
| 2,992,454 | 7/1961 | Elphee | 18—2 |
| 3,001,239 | 9/1961 | Santellie et al. | 18—55 |
| 3,015,849 | 1/1962 | Mittelstadt et al. | 18—30 |
| 3,028,624 | 4/1962 | Parfrey | 18—5 |
| 3,029,468 | 4/1962 | Valyi | 18—5 |
| 3,029,471 | 4/1962 | Adams et al. | 18—30 |
| 3,060,497 | 10/1962 | Boyer | 18—5 |
| 3,084,395 | 4/1963 | Thielfoldt | 18—55 |
| 3,089,192 | 5/1963 | Adams | 18—5 |

J. SPENCER OVERHOLSER, *Primary Examiner.*

ROBERT F. WHITE, MICHAEL V. BRINDISI, WILLIAM J. STEPHENSON, *Examiners.*